United States Patent
Kamikake

(10) Patent No.: US 12,216,006 B2
(45) Date of Patent: Feb. 4, 2025

(54) INFRARED LIGHT SOURCE DEVICE AND FOURIER TRANSFORM INFRARED SPECTROSCOPE

(71) Applicant: SHIMADZU CORPORATION, Kyoto (JP)

(72) Inventor: Tadafumi Kamikake, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 256 days.

(21) Appl. No.: 17/729,220

(22) Filed: Apr. 26, 2022

(65) Prior Publication Data

US 2022/0381613 A1    Dec. 1, 2022

(30) Foreign Application Priority Data

May 31, 2021    (JP) .................. 2021-090850

(51) Int. Cl.
| | | |
|---|---|---|
| *G01J 3/10* | (2006.01) | |
| *G01J 3/02* | (2006.01) | |
| *G01J 3/45* | (2006.01) | |
| *G01J 3/453* | (2006.01) | |
| *G01N 21/35* | (2014.01) | |

(52) U.S. Cl.
CPC .............. *G01J 3/108* (2013.01); *G01J 3/0202* (2013.01); *G01J 3/4535* (2013.01); *G01N 21/35* (2013.01); *G01N 2021/3595* (2013.01)

(58) Field of Classification Search
CPC ........ G01J 3/108; G01J 3/0202; G01J 3/4535; G01N 21/35; G01N 2021/3595
USPC ..................................... 250/504 R
See application file for complete search history.

(56) References Cited

U.S. PATENT DOCUMENTS

| | | |
|---|---|---|
| 4,803,370 A | 2/1989 | Eckles |
| 7,119,904 B2 | 10/2006 | Coffin et al. |
| 2018/0113026 A1 | 4/2018 | Kamikake |
| 2022/0107263 A1* | 4/2022 | Biesinger .............. G01J 3/0232 |

FOREIGN PATENT DOCUMENTS

| | | |
|---|---|---|
| JP | 47-18591 A | 9/1972 |
| JP | 48-29493 A | 4/1973 |
| JP | 8-297085 A | 11/1996 |
| JP | 2003-149133 A | 5/2003 |
| WO | 2016/166872 A1 | 10/2016 |

OTHER PUBLICATIONS

Japanese Office Action dated Jul. 30, 2024 in Application No. 2021-090850.
Communication dated Nov. 26, 2024, issued in Japanese Application No. 2021-090850.

* cited by examiner

*Primary Examiner* — Nicole M Ippolito
(74) *Attorney, Agent, or Firm* — Sughrue Mion, PLLC

(57) ABSTRACT

An infrared light source device includes: a heater portion which emits infrared light by being heated; and a cover member arranged to cover an entire circumference of the heater portion without contacting the heater portion, and having a hole formed therein for emitting the infrared light from the heater portion to outside. A material for the cover member is a pure aluminum (an aluminum alloy with a purity of 99% or more), which has a high heat reflectivity and is less likely to be denatured by heat dissipation from the heater portion.

3 Claims, 5 Drawing Sheets

TIP SIDE ← → ROOT SIDE

TIP SIDE ← ROOT SIDE →

INFRARED LIGHT SOURCE DEVICE AND FOURIER TRANSFORM INFRARED SPECTROSCOPE

BACKGROUND OF THE INVENTION

Field of the Invention

The present disclosure relates to an infrared light source device, and a Fourier transform infrared spectroscope including the infrared light source device.

Description of the Background Art

A Fourier transform infrared spectroscope (FTIR) splits infrared light from an infrared light source device into two by a beam splitter, emits one split infrared light to a fixed mirror and the other split infrared light to a moving mirror. Then, their reflection light beams are guided into the same optical path to generate interference light. This interference light is emitted to a sample to be measured, transmitted light therethrough or reflected light therefrom is detected by a detector, and a detection signal by the detector is sent to a data processing device. The data processing device Fourier-transforms the detection signal to produce a spectrum, and performs qualitative analysis or quantitative analysis of the sample based on peak wavelength, peak intensity, and the like of this spectrum (see, for example, WO 2016/166872).

SUMMARY OF THE INVENTION

An infrared light source device of an FTIR generally includes a ceramic heater which serves as an infrared light source by being heated to about 1000° C. and emitting infrared light, a heat insulating material (such as porous ceramic) with a low heat conductivity arranged to cover the circumference of the heater (infrared light source), and a metal cover which covers the circumference of the heat insulating material. By covering the heater with the two layers, that is, the heat insulating material and the metal cover, as described above, the temperature of the heater can be maintained at a target temperature or more, while suppressing power consumption of the heater.

In order to maintain the temperature of the heater (infrared light source) at the target temperature or more in the infrared light source device having a structure as described above, it is necessary to set the thickness of the heat insulating material to a certain value or more, which may lead to an increase in size of the infrared light source device. Accordingly, in order to downsize the infrared light source device, options other than the heat insulating material (such as porous ceramic) are required as a member for maintaining the temperature of the light source at the target temperature or more.

The present disclosure has been made to solve the aforementioned problem, and an object of the present disclosure is to downsize an infrared light source device while maintaining the temperature of an infrared light source at a target temperature or more.

An infrared light source device in accordance with the present disclosure includes: a heater which emits infrared light by being heated; and a cover member arranged to cover an entire circumference of the heater without contacting the heater, and having a hole formed therein for emitting the infrared light from the heater to outside. A material for an inner wall of the cover member is aluminum or gold.

A Fourier transform infrared spectroscope in accordance with the present disclosure includes the infrared light source device described above.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
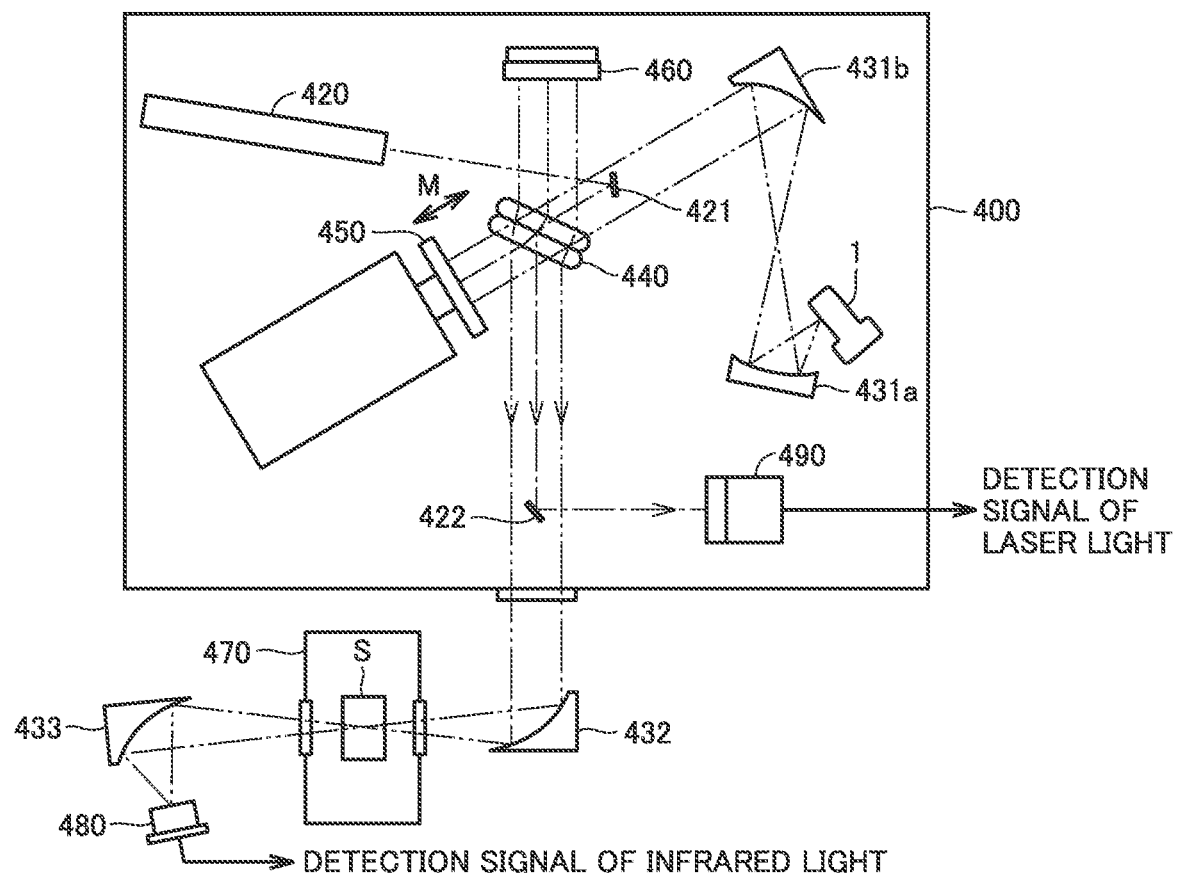
FIG. 1 is a view schematically showing an example of a configuration of an FTIR.

Hereinafter, an embodiment of the present disclosure will be described in detail with reference to the drawings. It should be noted that identical or corresponding parts in the drawings will be designated by the same reference numerals, and the description thereof will not be repeated.

FIG. 1 is a view schematically showing an example of a configuration of an FTIR (Fourier transform infrared spectroscope) including an infrared light source device 1 in accordance with the present embodiment.

This FTIR includes an interferometer chamber 400, a paraboloidal mirror 432, a sample chamber 470, an ellipsoidal mirror 433, and an infrared light detector 480. Interferometer chamber 400 accommodates a main interferometer including infrared light source device 1, a converging mirror 431a, a collimator mirror 431b, a beam splitter 440, a moving mirror 450, and a fixed mirror 460. Sample chamber 470 accommodates a sample S to be measured.

In the main interferometer within interferometer chamber 400, infrared light source device 1 emits infrared light. The infrared light emitted from infrared light source device 1 impinges on converging mirror 431a and collimator mirror 431b and is split into two by beam splitter 440. Of the infrared light split into two by beam splitter 440, one split infrared light is reflected by fixed mirror 460 and the other split infrared light is reflected by moving mirror 450, and they are merged again into an identical light path and becomes infrared interference light.

The infrared interference light is emitted from interferometer chamber 400 toward paraboloidal mirror 432, is converged by paraboloidal mirror 432, and then enters into sample chamber 470. When the infrared interference light is emitted to sample S, it is subject to absorption at a wavelength specific to sample S. The infrared interference light which has been subject to absorption impinges on ellipsoidal mirror 433, is detected by infrared light detector 480, and is Fourier-transformed to produce a spectrum.

In such an FTIR, it is possible to obtain a spectrum with high accuracy by keeping the moving speed of moving mirror 450 constant. To measure the moving speed of moving mirror 450, a control interferometer is used, which includes a laser light source 420, first and second laser light reflecting mirrors 421 and 422, beam splitter 440, moving mirror 450, and fixed mirror 460. In the control interferometer, laser light emitted from laser light source 420 is introduced onto the same light path as that of the infrared light by first laser light reflecting mirror 421, passes through the same interference system (beam splitter 440, moving mirror 450, fixed mirror 460) as that of the infrared light, and thereby laser interference light is generated. The laser interference light is taken out of the light path of the infrared interference light by second laser light reflecting mirror 422, and is detected by a laser light detector 490. The moving speed of moving mirror 450 is calculated based on the detected laser interference light.

Figure 2:
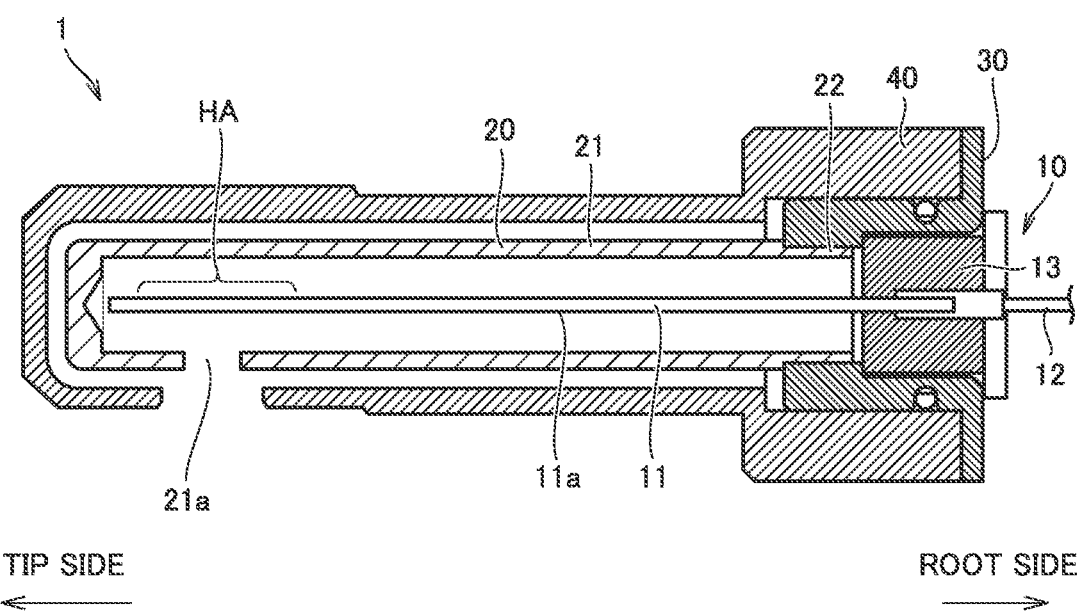
FIG. 2 is a cross sectional view of an infrared light source device 1.

FIG. 2 is a cross sectional view of infrared light source device 1. Infrared light source device 1 includes a ceramic heater 10, a cylindrical cover member 20, a cylindrical support member 30, and a cylindrical case 40.

Ceramic heater 10 includes a heater portion 11 made of ceramic such as silicon nitride SiN, a power line 12 for supplying power to heater portion 11, and a base portion 13 which supports heater portion 11 and power line 12. Ceramic heater 10 is fixed to support member 30 by fitting base portion 13 of ceramic heater 10 into an inner wall on a root side of support member 30.

Cover member 20 has the shape of a cylinder whose end portion on a tip side is closed and whose end portion on the root side is opened. Cover member 20 includes a main body portion 21 and a fitted portion 22 arranged closer to the root side than main body portion 21. The thickness of fitted portion 22 is formed to be thinner than the thickness of main body portion 21. Cover member 20 is fixed to support member 30 by fitting fitted portion 22 of cover member 20 into the inner wall on the tip side of support member 30.

In a state where ceramic heater 10 and cover member 20 are fitted into support member 30, cover member 20 is arranged to cover the entire circumference of heater portion 11 without contacting heater portion 11 of ceramic heater 10.

A region on the tip side of heater portion 11 is provided with a heat generating portion HA which generates heat using the power supplied from power line 12. By heating this heat generating portion HA to about 1000° C., heater portion 11 serves as an infrared light source which emits infrared light.

Case 40 is formed to cover cover member 20. Case 40 is fixed to support member 30 by fitting an inner wall on the root side of case 40 onto an outer wall of support member 30. The infrared light emitted from heat generating portion HA of ceramic heater 10 passes through a hole 21a in cover member 20 and is emitted to the outside.

Figure 3:
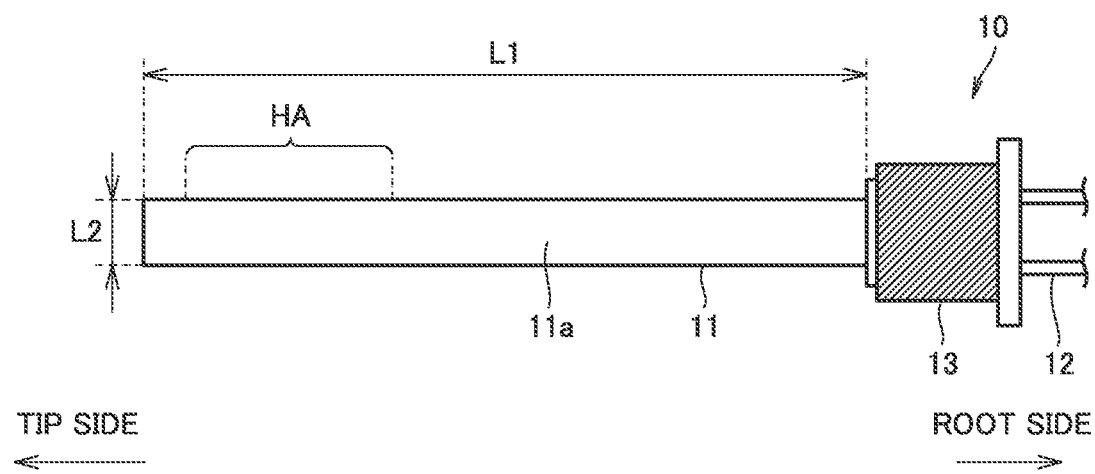
FIG. 3 is a plan view of a ceramic heater.

FIG. 3 is a plan view of ceramic heater 10. As shown in FIG. 3, heater portion 11 is formed in the shape of a rectangular plate. FIG. 3 shows a state where ceramic heater 10 is viewed from a direction along a normal to a main surface 11a of heater portion 11. It should be noted that FIG. 2 described above shows a state where infrared light source device 1 is viewed from a direction along main surface 11a of heater portion 11.

A dimension L1 in a longitudinal direction of heater portion 11, a dimension L2 in a short direction of heater portion 11, and the thickness of heater portion 11 can be set, for example, to about 50 mm, about 5 mm, and about 1.5 mm, respectively.

Figure 4:
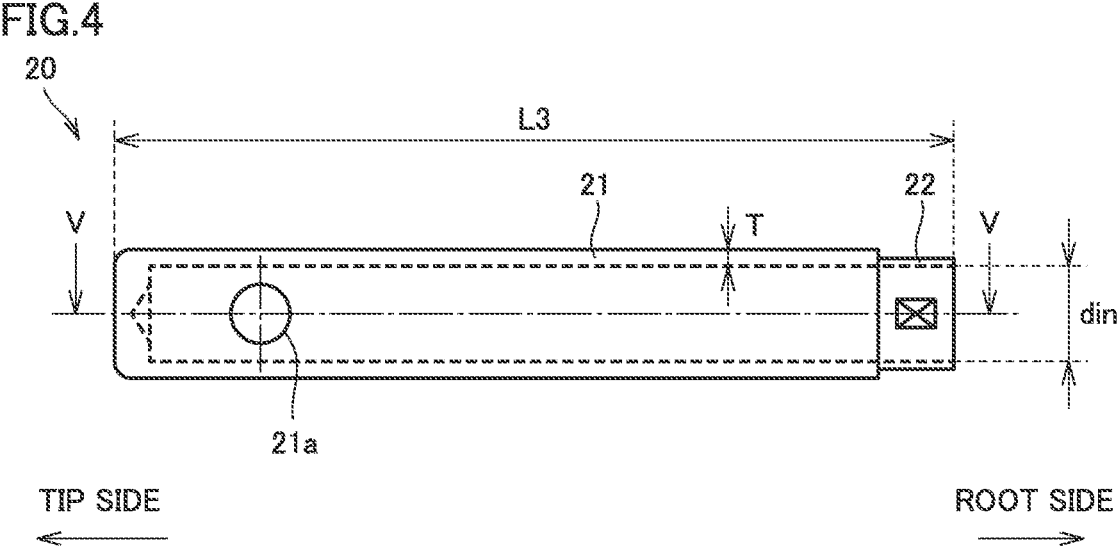
FIG. 4 is a plan view of a cover member.
Figure 5:
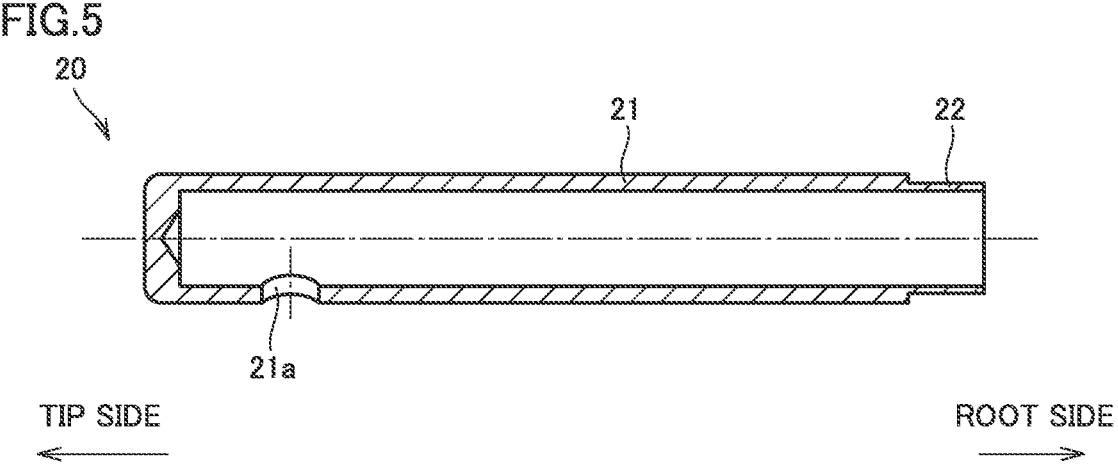
FIG. 5 is a cross sectional view of the cover member in FIG. 4 taken along a line V-V.

FIG. 4 is a plan view of cover member 20. FIG. 5 is a cross sectional view of cover member 20 in FIG. 4 taken along a line V-V. As described above, cover member 20 has the shape of a cylinder whose end portion on the tip side is closed and whose end portion on the root side is opened.

A diameter din of an inner wall of cover member 20 is set to a value (for example, about 8 mm) which is slightly larger than dimension L2 (for example, about 5 mm) in the short direction of heater portion 11 of ceramic heater 10.

Main body portion 21 of cover member 20 has hole 21a formed therein for emitting the infrared light from heat generating portion HA of ceramic heater 10 to the outside. The diameter of hole 21a can be set to about 8 mm, for example. In addition, a thickness T of main body portion 21 of cover member 20 can be set to about 1.5 mm, for example.

In the present embodiment, a pure aluminum (aluminum with a purity of 99% or more), which has a high heat reflectivity and is less likely to be denatured by heat dissipation from heater portion 11, is employed as a material for cover member 20. For example, an aluminum alloy of JIS (Japanese Industrial Standards) A1000 series, more specifically, A1070 with an aluminum purity of 99.7% or more, or A1050 with an aluminum purity of 99.5% or more, is employed as the material for cover member 20.

In infrared light source device 1 in accordance with the present embodiment, cover member 20 made of the pure aluminum having a high heat reflectivity as described above is arranged to cover the entire circumference of heater portion 11. Thereby, instead of trapping the heat of heater portion 11 using a heat insulating material, heat radiation released from heater portion 11 can be efficiently reflected to heater portion 11 to heat heater portion 11. Thus, when compared with a case where the circumference of heater portion 11 is covered with a heat insulating material such as porous ceramic (a case corresponding to a conventional structure), infrared light source device 1 can be downsized by reducing the thickness of cover member 20, while maintaining the temperature of heater portion 11 at a target temperature (for example, about 1000° C.) or more. In addition, infrared light source device 1 can also be manufactured at a lower cost, because the pure aluminum is less expensive than the heat insulating material such as porous ceramic.

Further, in the present embodiment, the pure aluminum, which has a high heat reflectivity and is also less likely to be denatured by heat (on which an oxide film is less likely to be formed), is employed as the material for cover member 20. This can suppress deterioration over time of the heat reflectivity of cover member 20 as much as possible.

The inventors of the present application set power consumption of ceramic heater 10 to be constant, covered the heater with a cover made of a variety of materials, and conducted experiments to confirm how much infrared light the heater emitted (that is, how much high temperature the heater itself had) using an infrared light detector.

When the material for the cover was ceramic (alumina), the heater had a low temperature, because alumina originally has a high emissivity.

When the material for the cover was stainless steel (SUS), at the beginning of an experiment, the heater had a high temperature, because stainless steel has a high reflectivity (that is, a low emissivity). However, as time passed, an oxide film was gradually formed on a cover surface, the cover surface turned black, and thereby the reflectivity of stainless steel decreased and the temperature of the heater gradually decreased.

Also when the material for the cover was stainless steel (SUS) and the inner wall of the cover was plated with gold, at the beginning of an experiment, the heater had a high temperature, because gold plating has a very high reflectivity. However, due to change over time, the cover surface turned black and the temperature of the heater decreased.

When the material for the cover was stainless steel (SUS) and the inner wall of the cover was plated with chromium, the heater had a low temperature, because the reflectivity of chromium is lower than that of gold or aluminum.

When the material for the cover was A6061 (an aluminum alloy with an aluminum purity of less than 99%), at the beginning of an experiment, the heater had a high temperature due to a high reflectivity. However, the temperature of the heater gradually decreased due to an oxide film of an alloy content added to aluminum.

When the material for the cover was A1050 (an aluminum alloy with an aluminum purity of 99.5% or more), the temperature of the heater was maintained at a high value due to a high reflectivity, and there was almost no influence of an oxide film and there was no temperature decrease over time. From the results of these experiments, it can be understood that the most excellent result can be obtained by employing a pure aluminum (aluminum with a purity of 99% or more) as the material for cover member 20 as in the present embodiment.

Further, in infrared light source device 1 in accordance with the present embodiment, by employing the structure of fitting ceramic heater 10 and cover member 20 into support member 30, cover member 20 can be easily and appropriately suppressed from contacting heater portion 11. That is, even if heater portion 11 is inclined with respect to cover member 20 when heater portion 11 is inserted into cover member 20, cover member 20 can be fixed without contacting heater portion 11 as ceramic heater 10 and cover member 20 are eventually fitted into support member 30. Thereby, even in a case where the temperature of heater portion 11 reaches or exceeds 1000° C., which is higher than the melting point of aluminum (660° C.), the temperature of cover member 20 can be maintained at a temperature lower than the melting point of aluminum (660° C.). As a result, cover member 20 can be appropriately suppressed from melting and deforming due to the heat from heater portion 11.

It should be noted that, in order to fix a heat insulating material such as porous ceramic, which is difficult to be finely machined, without contacting heater portion 11, it may be necessary to take measures such as additionally providing a metal cover for fixation around the heat insulating material. In contrast, in infrared light source device 1 in accordance with the present embodiment, the material for cover member 20 is aluminum, which can be finely machined easily. Thus, there is no need to additionally provide a metal cover for fixation, and infrared light source device 1 can have a simple structure.

As described above, in the present embodiment, infrared light source device 1 can be downsized and manufactured at a lower cost, while maintaining the temperature of heater portion 11 (infrared light source) at the target temperature or more.

[Variations]

The above embodiment has described the case where the material for cover member 20 is a pure aluminum. However, the material for cover member 20 is not necessarily limited to a pure aluminum. For example, the material for cover member 20 may be gold.

Further, as long as the material for the inner wall of cover member 20 is a pure aluminum or gold, the material for cover member 20 itself may not necessarily be a pure aluminum or gold. For example, a pure aluminum or gold may be deposited on the inner wall of cover member 20 made of a material other than a pure aluminum and gold.

Further, the material for cover member 20 may be an aluminum alloy with a purity of less than 99%. However, in order to suppress deterioration due to an oxide film as described above, it is preferable to set the purity of the aluminum alloy to a value which is close to 99% as much as possible.

[Aspects]

As will be appreciated by those skilled in the art, the embodiment and variations thereof described above are specific examples of the following aspects.

(First Item)

An infrared light source device in accordance with one aspect includes: a heater which emits infrared light by being heated; and a cover member arranged to cover an entire circumference of the heater without contacting the heater, and having a hole formed therein for emitting the infrared light from the heater to outside. A material for an inner wall of the cover member is aluminum or gold.

According to the infrared light source device according to the first item, the cover member having the inner wall made of aluminum or gold with a high heat reflectivity is arranged to cover the entire circumference of the heater. Thereby, heat radiation from the heater can be efficiently reflected by the inner wall of the cover member to the heater to heat the heater. Thereby, when compared with a case where a heat insulating material is used, the thickness of the cover member can be reduced, while maintaining the heater at a high temperature. As a result, the infrared light source device can be downsized, while maintaining the temperature of the heater at a target temperature or more.

(Second Item)

In the infrared light source device according to the first item, a material for the cover member is aluminum with a purity of 99% or more.

According to the infrared light source device according to the second item, since the material for the cover member is aluminum with a purity of 99% or more, heat radiation from the heater can be efficiently reflected to the heater to heat the heater. Further, when compared with a case where the material for the cover member is ceramic (alumina), stainless steel (SUS), or aluminum with a purity of less than 99%, for example, an oxide layer can be less likely to be formed on the surface of the cover member. Thus, deterioration over time of the heat reflectivity of the cover member can be easily suppressed.

(Third Item)

The infrared light source device according to the first or second item further includes a support member into which the heater and the cover member are fitted. In a state where the heater and the cover member are fitted into the support member, the cover member is arranged to cover the entire circumference of the heater without contacting the heater.

According to the infrared light source device according to the third item, by employing the structure of fitting the heater and the cover member into the support member, the cover member can be easily and appropriately suppressed from contacting the heater.

(Fourth Item)

A Fourier transform infrared spectroscope in accordance with one aspect includes the infrared light source device according to any one of the first to third items.

According to the Fourier transform infrared spectroscope, it is possible to achieve a Fourier transform infrared spectroscope including an infrared light source device which is downsized while maintaining the temperature of a heater at a target temperature or more.

Although the embodiment of the present invention has been described, it should be understood that the embodiment disclosed herein is illustrative and non-restrictive in every respect. The scope of the present invention is defined by the scope of the claims, and is intended to include any modifications within the scope and meaning equivalent to the scope of the claims.

What is claimed is:

1. An infrared light source device comprising:
   a heater which emits infrared light by being heated; and
   a cover member arranged to cover an entire circumference of the heater without contacting the heater, and having a hole formed therein for emitting the infrared light from the heater to outside, wherein a material for the cover member is aluminum with a purity of 99% or more;
   a material for an inner wall of the cover member being aluminum or gold.

2. The infrared light source device according to claim 1, further comprising
   a support member into which the heater and the cover member are fitted, wherein
   in a state where the heater and the cover member are fitted into the support member, the cover member is arranged to cover the entire circumference of the heater without contacting the heater.

3. A Fourier transform infrared spectroscope comprising the infrared light source device according to claim 1.

* * * * *